(12) United States Patent
Frustie et al.

(10) Patent No.: US 7,938,224 B2
(45) Date of Patent: May 10, 2011

(54) COATING FOR ACOUSTIC TREATMENT INTEGRATING THE FUNCTION OF FROST TREATMENT WITH HOT AIR

(75) Inventors: Valerie Frustie, Toulouse (FR); Bernard Duprieu, Toulouse (FR); Fabrice Gantie, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 12/528,007

(22) PCT Filed: Feb. 14, 2008

(86) PCT No.: PCT/FR2008/050244
§ 371 (c)(1), (2), (4) Date: Aug. 20, 2009

(87) PCT Pub. No.: WO2008/104714
PCT Pub. Date: Sep. 4, 2008

(65) Prior Publication Data
US 2010/0096213 A1   Apr. 22, 2010

(30) Foreign Application Priority Data

Feb. 20, 2007   (FR) ..................... 07 53358

(51) Int. Cl.
*B64D 33/02* (2006.01)
(52) U.S. Cl. ......... 181/214; 181/213; 181/290; 181/292
(58) Field of Classification Search ................. 181/290, 181/292, 214, 213; 244/1 N; 415/119
See application file for complete search history.

(56) References Cited

U.S. PATENT DOCUMENTS

| | | | | |
|---|---|---|---|---|
| 3,670,843 A | * | 6/1972 | Kelly et al. | 181/292 |
| 3,933,327 A | | 1/1976 | Cook et al. | |
| 4,001,473 A | * | 1/1977 | Cook | 428/116 |
| 5,743,488 A | * | 4/1998 | Rolston et al. | 244/53 B |
| 5,841,079 A | * | 11/1998 | Parente | 181/214 |
| 5,934,611 A | * | 8/1999 | Tindell et al. | 244/53 B |

(Continued)

FOREIGN PATENT DOCUMENTS

EP   1 103 462   5/2001

(Continued)

OTHER PUBLICATIONS

International Search Report dated Sep. 29, 2008, from corresponding PCT application.

*Primary Examiner* — Elvin G Enad
*Assistant Examiner* — Forrest M Phillips
(74) *Attorney, Agent, or Firm* — Young & Thompson

(57) ABSTRACT

A coating for acoustic treatment relative to an aircraft's surface, in particular a leading edge such as an air intake of an aircraft nacelle, includes an acoustically resistive layer, at least one alveolar structure (30), and a reflective layer. The alveolar structure (30) includes a number of tubes that empty out, on the one hand, at a first imaginary surface (34), and, on the other hand, at a second imaginary surface (36). The alveolar structure (30) includes cut-outs or openings (38) made at the side walls of certain tubes that make it possible to link adjacent tubes so as to create a network of communicating tubes that isolate at least one tube or a group of non-communicating tubes, whereby at least one of the communicating tubes is connected to at least one hot gas intake (40).

16 Claims, 5 Drawing Sheets

U.S. PATENT DOCUMENTS

Figure 1:
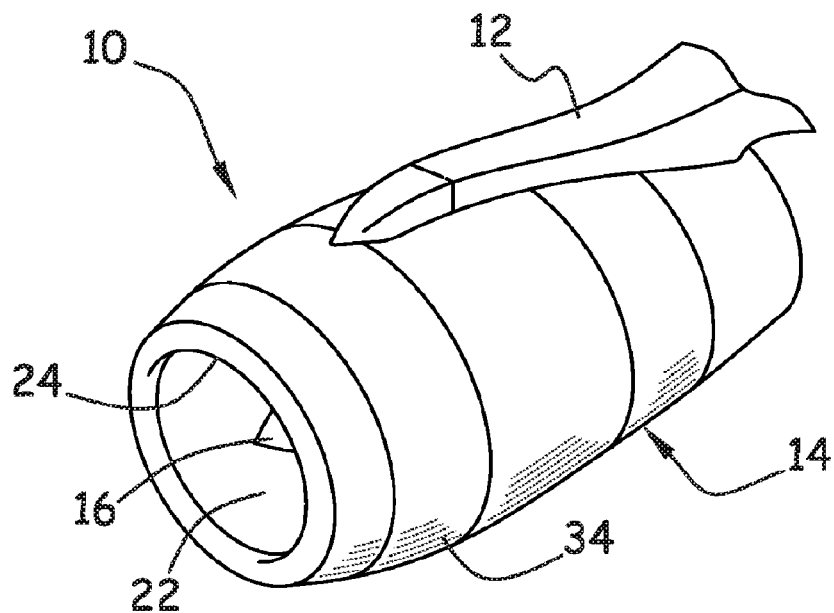

| | | | |
|---|---|---|---|
| 6,688,558 B2 * | 2/2004 | Breer et al. | 244/134 R |
| 6,698,691 B2 | 3/2004 | Porte | |
| 2003/0031556 A1 | 2/2003 | Mulcaire et al. | |
| 2006/0219475 A1 | 10/2006 | Olsen et al. | |
| 2006/0289232 A1 * | 12/2006 | Muller | 181/292 |

FOREIGN PATENT DOCUMENTS

| | | |
|---|---|---|
| EP | 1 232 944 | 8/2002 |
| EP | 1 495 963 | 1/2005 |
| FR | 2 887 518 | 12/2006 |

* cited by examiner

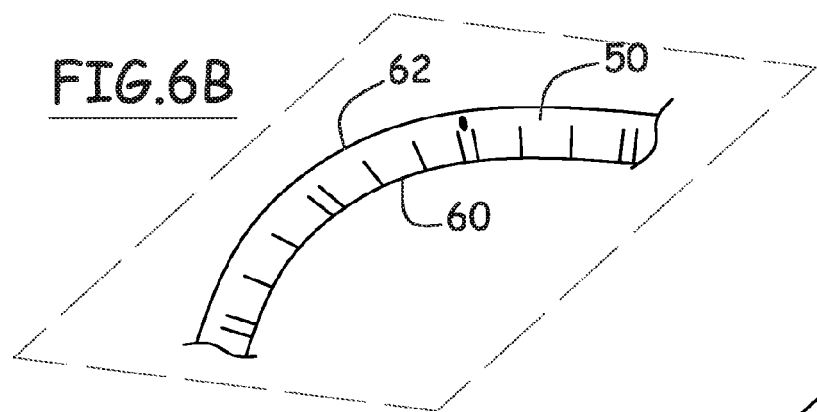
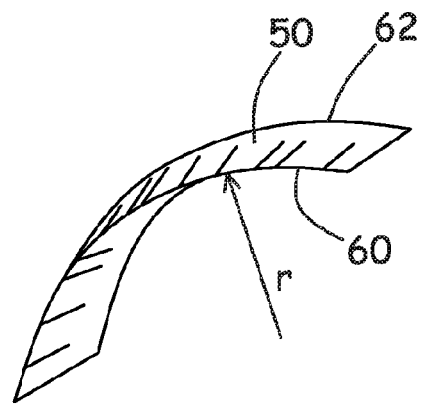
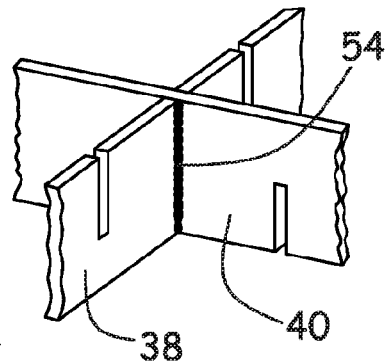
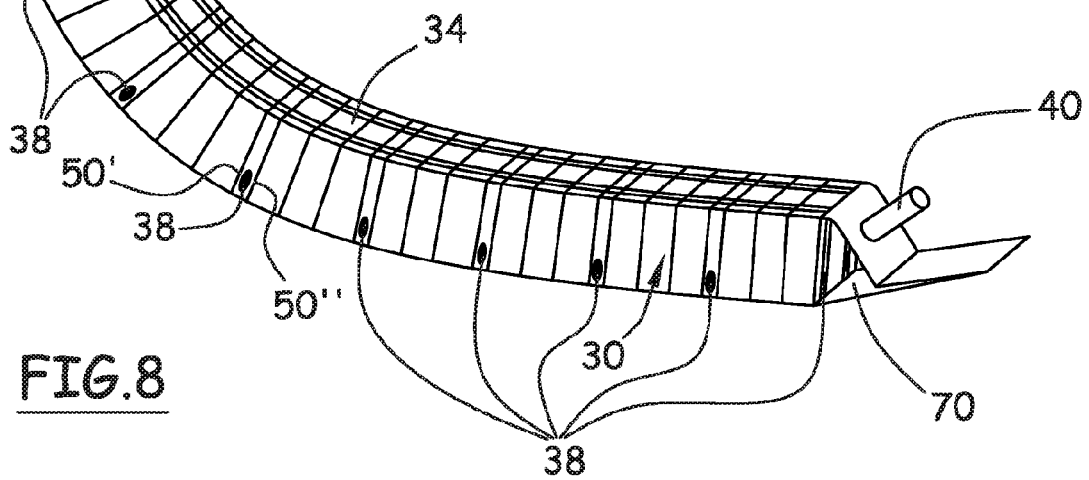

COATING FOR ACOUSTIC TREATMENT INTEGRATING THE FUNCTION OF FROST TREATMENT WITH HOT AIR

This invention relates to a coating for acoustic treatment integrating the function of frost treatment with hot air, whereby said coating is designed in particular for a leading edge of an aircraft, and more particularly for an air intake of an aircraft nacelle.

To limit the impact of the sound pollution close to airports, the international standards are increasingly restrictive as far as sound emissions are concerned.

Techniques have been developed for reducing the noise that is emitted by an aircraft, in particular by arranging, at walls of the tubes of nacelles, coatings that are designed to absorb a portion of the sound energy, in particular by using the principle of Helmholtz resonators. In a known manner, this acoustic treatment comprises—from the outside to the inside—an acoustically resistive porous layer, an alveolar structure, and a reflective layer that is impermeable to sound waves so that the coating is effective.

For the moment, because of the different stresses, for example shaping or compatibility with other equipment, the extent of the treated surfaces is limited. Thus, the coating is not very compatible with the systems that make it possible to prevent the formation and/or the accumulation of ice and/or frost that are necessary in these zones.

These systems are divided into two large families, the first family called defrosting systems that make it possible to limit the formation of ice and/or frost, and the second family called de-icing systems that limit the accumulation of ice and/or frost and act once the ice and/or frost is formed. Hereinafter, a frost treatment system or process is defined as a defrosting system or process or a de-icing system or process.

This invention relates more particularly to a frost treatment process that consists in using hot air that is taken from the engine and fed back at the inside wall of the leading edges. This high-quality system is not very compatible with the acoustic treatment coating to the extent that the latter is relatively thick and consists of cells that contain air and that act as an insulating material.

To attempt to make the acoustic and frost treatments compatible, a solution that is described in the documents EP-1,103,462 and U.S. Pat. No. 5,841,079 provides holes in the reflective wall so that the hot air penetrates the cells of the acoustic coating.

This solution, however, is not satisfactory for the following reasons:

The cells of the alveolar structure that comprise one or more holes at the reflective layer are less capable in terms of acoustic treatment, whereby the waves dissipate less well in said cells. To reduce this alteration, a solution consists in reducing the cross-section of the holes. In this case, the volume of air at a constant flow rate is reduced, making the de-icing less effective. Furthermore, these holes of reduced cross-sections can be plugged more easily, which eliminates the de-icing function in the corresponding zone.

According to another problem, to the extent that the alveolar structure that consists of a honeycomb is deformed during its installation, certain holes of the reflective layer can be arranged facing a side wall that delimits two cells. In this case, the operation in terms of acoustic treatment of two cells is altered, and the de-icing function is also altered, whereby the hole is partially plugged by the wall.

Finally, according to another problem, since a pressure balance forms inside the rim of the air intake, it is not possible to isolate certain portions of the rim so as to blow in there a stronger de-icing air pressure, in particular at the spots where the frost is deposited in larger quantities.

The purpose of this invention is to overcome the drawbacks of the prior art by proposing a coating that makes acoustic treatment and frost treatment with a hot gas compatible, whereby said coating is designed in particular for a leading edge and more particularly a nacelle air intake.

For this purpose, the invention has as its object a coating for acoustic treatment relative to a surface of an aircraft, in particular at a leading edge such as an air intake of an aircraft nacelle, whereby said coating comprises an acoustically resistive layer, at least one alveolar structure, and a reflective layer, whereby said alveolar structure comprises a number of tubes that empty out, on the one hand, at a first imaginary surface, and, on the other hand, at a second imaginary surface, characterized in that the alveolar structure comprises cut-outs or openings made at the side walls of certain tubes that make it possible to link adjacent tubes so as to create a network of communicating tubes that isolate at least one tube or a group of non-communicating tubes, whereby at least one of the communicating tubes is connected to at least one hot gas intake.

According to the invention, certain cells of the coating are dedicated exclusively to acoustic treatment and do not comprise any opening outside of the acoustically resistive layer.

Figure 2:
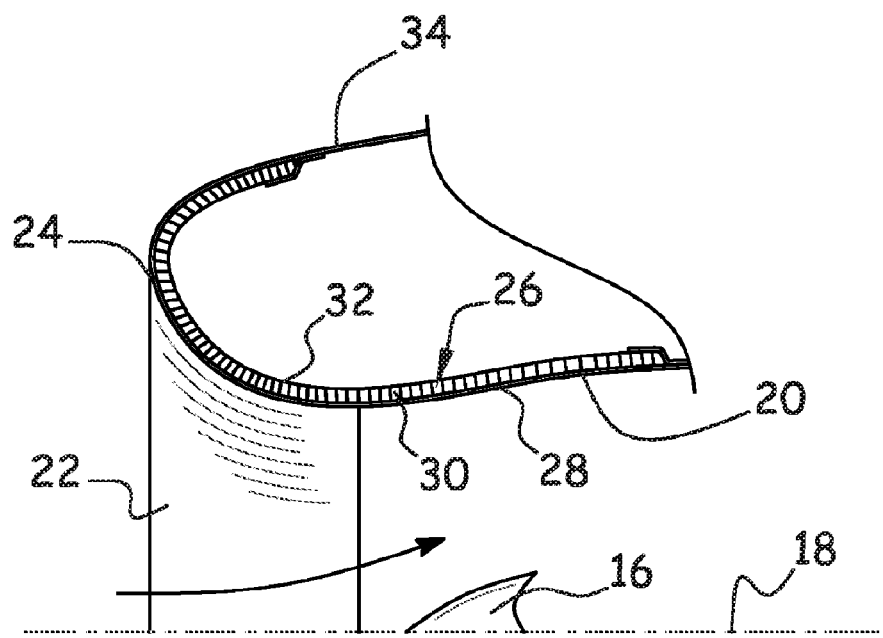
Figure 3:
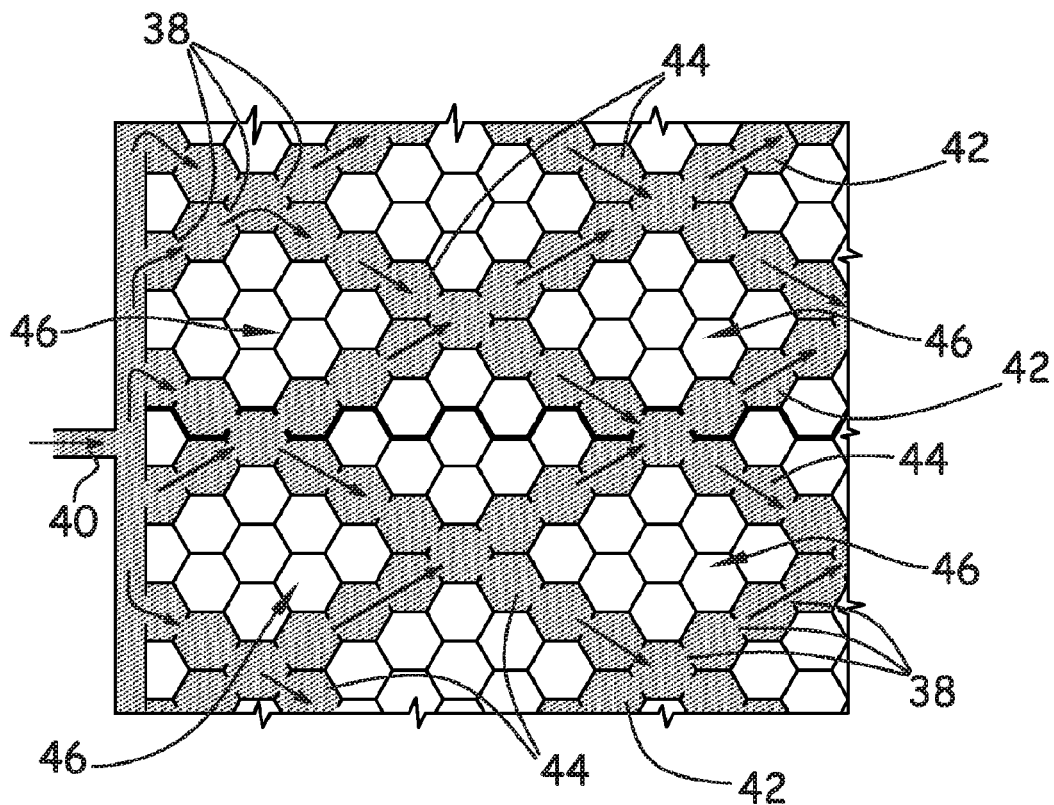
Figure 4:
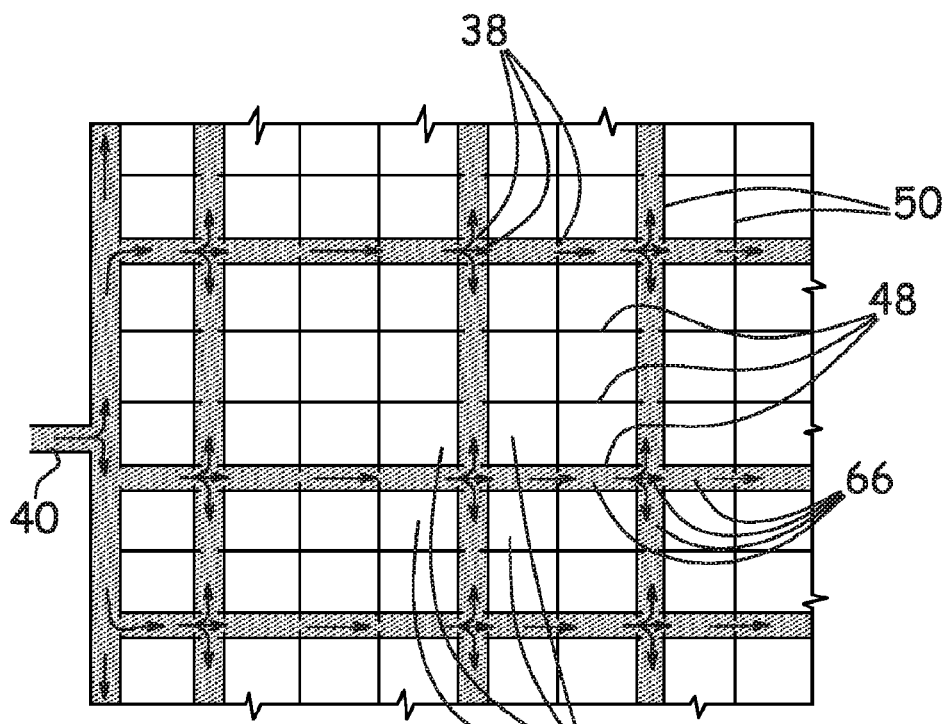
Figure 5:
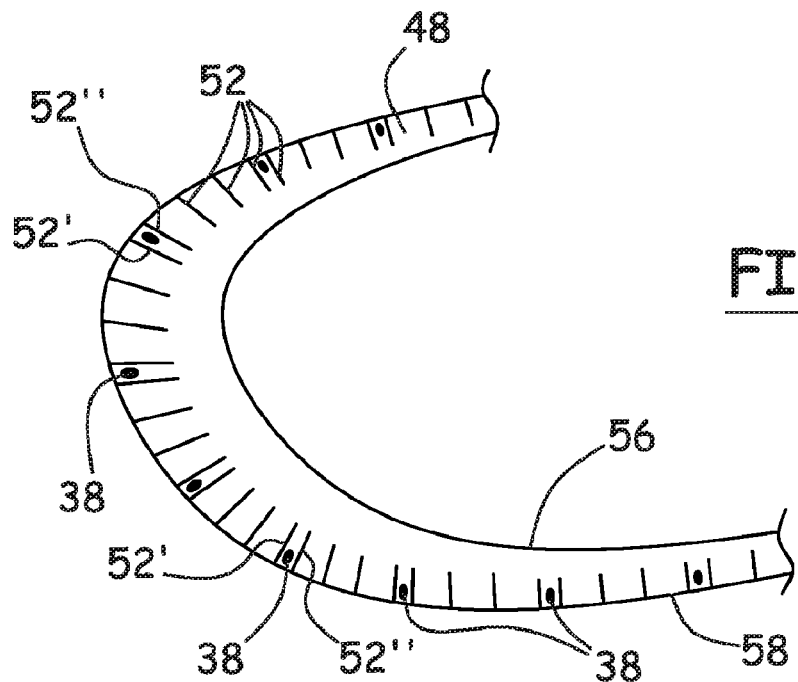
Figure 6A:
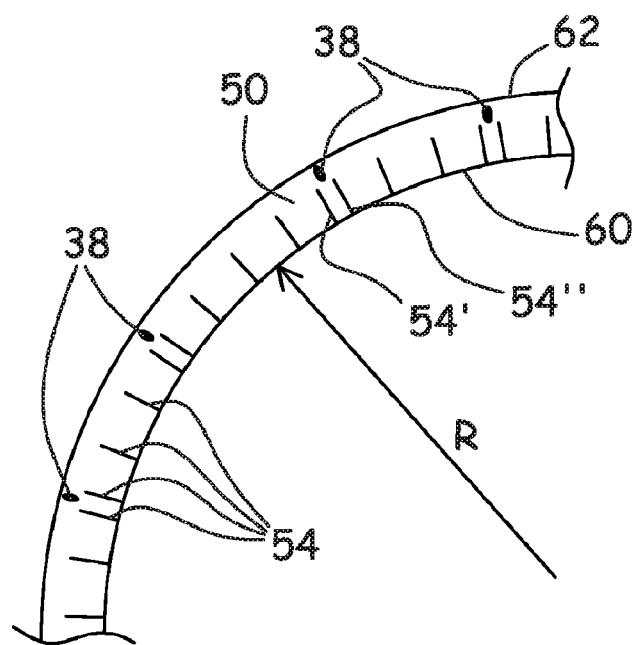
Figure 7A:
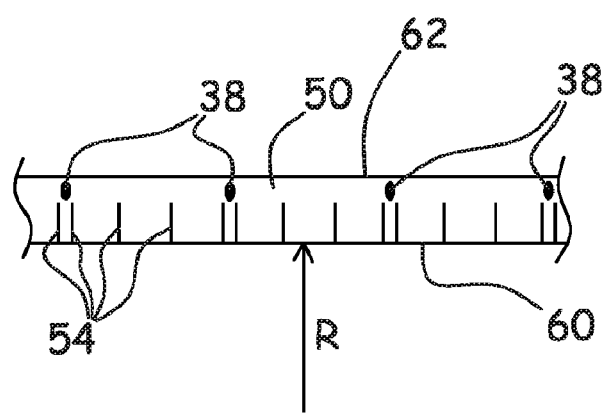
Figure 10:
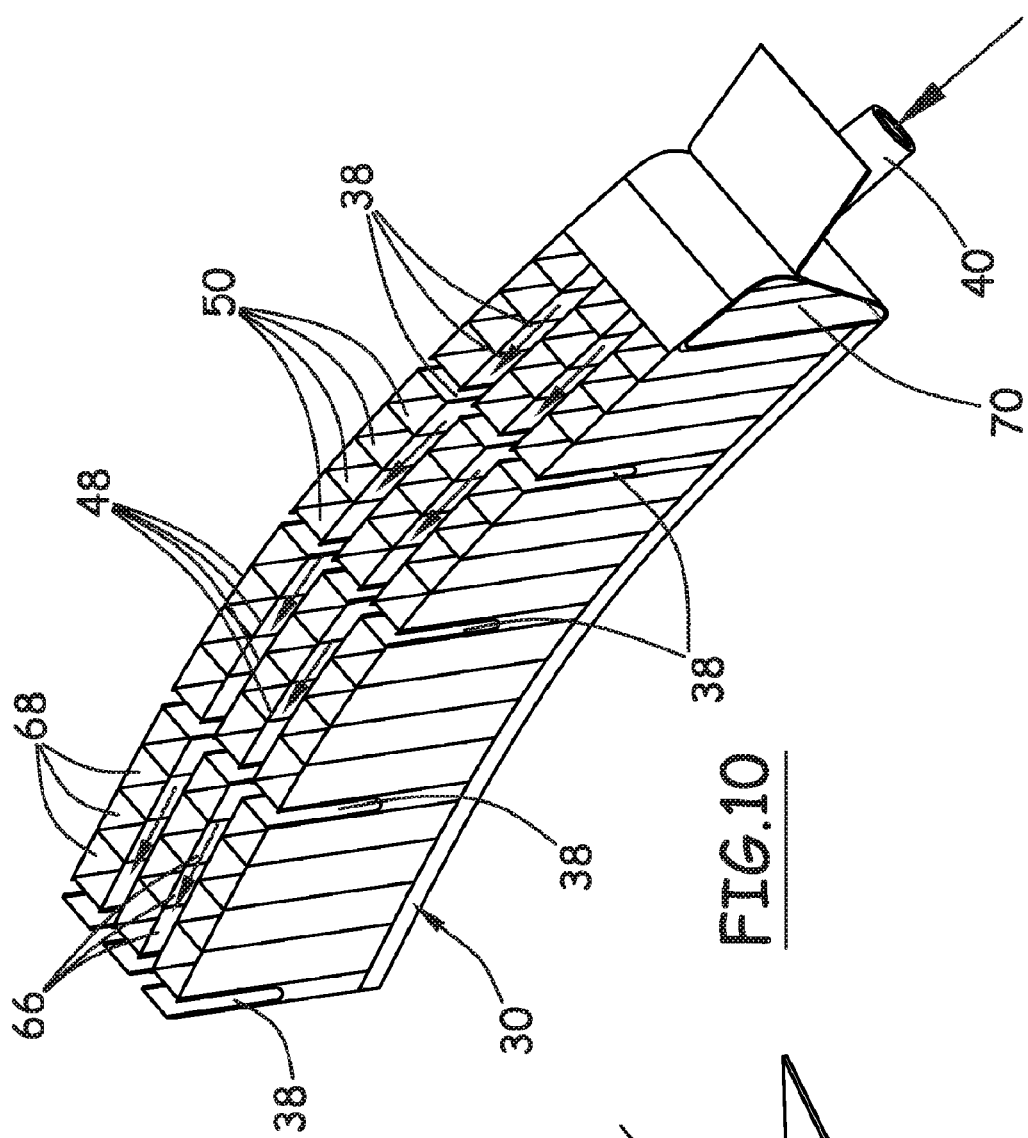
Figure 11:
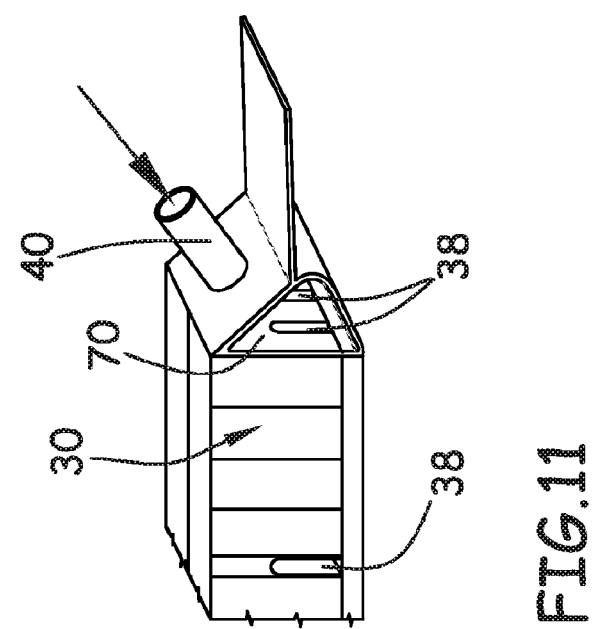

Other characteristics and advantages will emerge from the following description of the invention, a description that is provided only by way of example, with regard to the accompanying drawings, in which:

FIG. 1 is a perspective view of a propulsion unit of an aircraft,

FIG. 2 is a longitudinal cutaway that illustrates an air intake of a nacelle according to the invention, FIG. 3 is a top view of an alveolar structure according to a first variant of the invention, FIG. 4 is a top view of an alveolar structure according to another variant of the invention, FIG. 5 is an elevation view that illustrates a longitudinal band that is arranged in a radial plane, FIG. 6A is an elevation view that illustrates a first transverse band that is arranged along a first surface that is secant with the radial planes, FIG. 6B is a perspective view that illustrates in perspective the first band that is illustrated in FIG. 6A, FIG. 7A is an elevation view that illustrates a second transverse band that is arranged along a second surface that is secant with the radial planes, whereby said second surface follows the top part of the rim of a nacelle air intake, FIG. 7B is a perspective view that illustrates the second band that is illustrated in FIG. 7A, which can be curved to overlap with the first bands, FIG. 8 is a perspective view along a first angle of view illustrating an alveolar structure according to the invention that can be adapted to an angular sector of an air intake, FIG. 9 is a perspective view that illustrates in detail the connection between a longitudinal band and a transverse band, FIG. 10 is a perspective view along a second angle of view that illustrates an alveolar structure according to the invention that can be adapted to an angular sector of an air intake, and FIG. 11 is a perspective view that illustrates an air intake in detail.

This invention is now described applied to an air intake of a propulsion unit of an aircraft. However, it can be applied to different leading edges of an aircraft where an acoustic treatment and a frost treatment are performed, for example the leading edge of the wings.

Hereinafter, frost is defined both as frost and ice, of all kinds, all structures and all thicknesses.

In FIG. 1, a propulsion unit 10 of an aircraft that is connected under the wing by means of a mast 12 is shown. However, this propulsion unit could be connected to other zones of the aircraft.

This propulsion unit comprises a nacelle 14 in which a power plant that drives a fan that is mounted on its shaft 16 is arranged essentially concentrically. The longitudinal axis of the nacelle is referenced 18.

The nacelle 14 comprises an inside wall 20 that delimits a tube with an air intake 22 toward the front.

The top part 24 of the air intake 22 describes an essentially circular shape that extends in a plane that can be essentially perpendicular to the longitudinal axis 18, as illustrated in FIG. 2, or not perpendicular, with the top part located just before 12 o'clock. However, other air intake shapes can be considered.

Hereinafter, aerodynamic surface is defined as the shell of the aircraft that is in contact with the aerodynamic flow.

To limit the impact of pollution, a coating 26 whose purpose is to absorb a portion of the sound energy, in particular by using the principle of Helmholtz resonators, is provided in particular at the aerodynamic surfaces. In a known way, this acoustic coating, also called an acoustic panel, comprises—from the outside to the inside—an acoustically resistive layer 28, at least one alveolar structure 30, and a reflective layer 32.

Layer is defined as one or more layers that may or may not be of the same type.

The acoustically resistive layer 28 is a porous structure that plays a dissipative role, partially transforming the acoustic energy of the sound wave that passes through it into heat.

The reflective layer 32 is impermeable to sound waves and does not comprise an opening that can affect acoustic treatment.

These different layers are not described in more detail because they are known to one skilled in the art.

The alveolar structure 30 corresponds to a volume that is delimited by, on the one hand, a first imaginary surface 34 to which the reflective layer 32 can be connected, and, on the other hand, a second imaginary surface 36, to which the acoustically resistive layer 28 can be connected, as illustrated in FIG. 8.

The distance that separates the first imaginary surface 34 and the second imaginary surface 36 cannot be constant. Thus, this distance can be more significant at the rim of the air intake so as to impart to said structure a greater resistance, in particular to impacts.

The alveolar structure 30 comprises a number of tubes that empty out, on the one hand, at the first surface, and, on the other hand, at the second surface. These tubes are sealed by, on the one hand, the acoustically resistive porous layer, and, on the other hand, the reflective layer, so as to form a cell.

Preferably, two adjacent tubes are separated by a side wall.

To further reduce the noise pollution, the air intake 22 comprises an acoustic coating 26 on at least one portion of the aerodynamic surface.

According to one embodiment, this acoustic coating 26 extends from the inside wall 20 of the nacelle up to the top part 24 of the air intake over the entire periphery of the air intake. Preferably, as illustrated in FIGS. 2 and 6, the acoustic coating 26 extends beyond the top part 24 of the air intake and covers a portion of the outside surface 34 of the nacelle.

To limit the formation of frost or to prevent its accumulation, the air intake 22 comprises means for treating the frost.

This invention relates more specifically to a frost treatment process that consists in using the hot air that is taken from the engine and fed back at the inside wall of the aerodynamic surface.

According to the invention, the alveolar structure 30 comprises cut-outs or openings 38 that are made at the side walls of certain tubes that make it possible to link adjacent tubes so as to create a network of communicating tubes isolating at least one tube or a group of non-communicating tubes. In addition, the alveolar structure comprises at least one intake for a hot gas 40 at the side of the alveolar structure.

According to one embodiment, the alveolar structure comprises cut-outs at certain edges of the side walls that can be arranged at the second imaginary surface 36 that is coated by the acoustically resistive layer.

Thus, contrary to the prior art, the alveolar structure preserves non-communicating cells with a single surface that is permeable to sound waves, the one coated with the acoustically resistive layer. Thus, the operation of these non-communicating cells is not altered by the frost treatment, whereby the reflective layer remains impermeable.

According to a first embodiment illustrated in FIG. 3, the alveolar structure 30 consists of a honeycomb. Thus, the tubes have a hexagonal shape and the adjacent tubes are separated by side walls. According to the invention, the tubes that are arranged along certain diagonal lines communicate via cut-outs or openings 38. Preferably, the tubes communicate along first diagonal lines 42 that are oriented in a first direction and along second diagonal lines 44 that are oriented in a second direction. This configuration makes it possible to isolate groups 46 of non-communicating tubes via their side walls. By way of example, the communicating tubes, illustrated by gray tints in FIG. 3, make it possible to isolate nine non-communicating tubes.

According to another variant illustrated in FIGS. 4, 5, 6A, 6B, 7A, 7B, and 8 to 11, the alveolar structure 30 comprises, on the one hand, a number of first bands 48 called longitudinal bands that correspond to the intersection of the volume with radial planes incorporating the longitudinal axis 18, and, on the other hand, a number of second bands 50 called transverse bands that correspond to the intersection of the volume with surfaces that are secant with the radial planes. Preferably, at each point of intersection with the second imaginary surface 36, each transverse band 50 is approximately perpendicular to the tangent at the second imaginary surface 36 at the point under consideration.

Preferably, at each point of intersection with the transverse bands 50, each longitudinal band 48 is approximately perpendicular to the tangent of each transverse band 50 at the point under consideration.

Secant surface is defined as a plane or a surface that is secant with the first imaginary surface 34 and with the second imaginary surface 36.

More generally, the alveolar structure comprises a series of first bands 48 that are arranged at the secant surfaces, whereby said first non-secant bands 48 are spaced apart, and at least one second series of second bands 50 that are arranged at secant surfaces, whereby said second non-secant bands 50 are spaced apart. The first bands 48 are secant with the second bands so as to delimit a tube between, on the one hand, two first adjacent bands, and, on the other hand, two second adjacent bands.

Thus, tubes with four lateral surfaces are obtained.

Likewise, to simplify the design, the first bands will be arranged in radial planes that contain the longitudinal axis of the nacelle.

To obtain a more rigid structure, the second bands will be arranged so that they are approximately perpendicular to the first bands so as to obtain tubes with square or rectangular cross-sections. This solution also makes it possible to simplify the design. However, other cross-section shapes, for example, diamond-shaped, can be considered.

At curved zones, the cross-sections of the tubes are tapered. Thus, they vary between a large cross-section at the second imaginary surface 36 and a smaller cross-section at the first imaginary surface 34.

To assemble the bands of the different series that intersect, first cut-outs 52 are provided at the longitudinal bands 48 that work with second cut-outs 54 at the transverse bands 50. It is understood that it is sufficient to increase the number of cut-outs on each of the bands in the event of a number of series of bands that is greater than two.

The first and second cut-outs 52 and 54 do not extend from one edge to the next to facilitate the assembly.

The length of the first cut-outs 52 and that of the second cut-outs 54 are adjusted so that the edges of the longitudinal bands and transverse bands are arranged at imaginary surfaces 34 and 36.

According to one embodiment, the first cut-outs 52 extend from the edge of the longitudinal bands arranged at the second imaginary surface 36. In addition, the second cutouts 54 extend from the edge of the transverse bands arranged at the first imaginary surface 34.

According to one embodiment, the shape of the alveolar structure 30 that it will have when it is installed at the surface to be treated is digitized. The longitudinal and transverse bands are then positioned virtually so as to define the geometries for each of them. It is possible to make the surface area discrete using the same method as networking software. Making the surface area discrete is done by projection of geometries.

Thus, as illustrated in FIG. 5, in the case of an air intake, the longitudinal bands 48 have a C shape with a first edge 56 that is able to correspond to the first imaginary surface 34 and a second edge 58 that can correspond to the second imaginary surface 36. According to the variants, the distance that separates the edges 56 and 58 can vary from one band to the next or along the profile of the same band. The longitudinal bands 48 are cut out into essentially flat plates. This flat cutout simplifies production. To the extent where the longitudinal bands 48 are arranged in radial planes, they are not curved during the assembly with the transverse bands 50.

As illustrated in FIGS. 6A, 6B, 7A and 7B, in the case of an air intake, the transverse bands 50 have ring shapes with a first edge 60 that can correspond to the first imaginary surface 34 and a second edge 62 that can correspond to the second imaginary surface 36. The edges 60 and 62 have a radius of curvature that is able to vary gradually, based on the distance with the top part 24, from a value R that corresponds approximately to the radius of curvature of the tube that forms the nacelle for the transverse bands 50, as illustrated in FIG. 6A, and an infinite radius, whereby the edges 60 and 62 are approximately rectilinear, as illustrated in FIG. 7A, for the transverse band 50 that is arranged at the top part 24 of the air intake.

The transverse bands 50 are preferably cut out into essentially flat plates.

One advantage of the invention resides in the fact that the transverse and longitudinal bands are cut out flat, which contributes to simplifying the production and they do not undergo any shaping operation, which ensures the adjustment of cells on the reflective layer and the acoustically resistive layer.

The transverse bands, based on their position, are flexible enough to be able to be optionally curved so as to overlap in the longitudinal bands. As illustrated in FIG. 6B, the transverse bands 50 that are arranged in zones of the alveolar structure that have a single radius of curvature, in particular the approximately cylindrical parts, are arranged in planes once assembled.

The majority of the transverse bands 50 are flexible enough to be optionally curved along a radius of curvature r that is perpendicular to the surface of the bands, as illustrated in FIG. 7B, based on their position at the alveolar structure. Thus, the transverse bands 50 that are removed from the top part 24 are not curved, which corresponds to an infinite radius of curvature r, whereby the transverse bands 50 have a radius of curvature r that gradually decreases based on the distance that separates the transverse band under consideration of the top part 24 up to a radius r that is approximately equal to the radius of the top part for the transverse band 50, illustrated in FIGS. 7A and 7B, arranged at the top part 24.

According to an important advantage of the invention, the bands are no longer deformed once assembled or when the reflective or acoustically resistive layers are installed.

Whereby the thus constituted acoustic coating has shapes suited to those of the surface to be treated, it is no longer deformed during its installation at said surface to be treated. Consequently, contrary to the prior art, the connection between the alveolar structure and the reflective layer or the acoustically resistive layer no longer runs the risk of being damaged, and the position of the walls of the tubes that correspond to the bands is perfectly known and the side walls remain at the desired positions during the digitization.

As illustrated in FIG. 9, the longitudinal bands 48 and the transverse bands 50 are assembled and then connected to one another by welding, for example a brazing 64, or by gluing. However, other solutions for ensuring a connection between the bands can be considered.

According to the variants, the edges of the bands can have more complex shapes and comprise several radii of curvature so as to obtain more complex surfaces.

If appropriate, it is possible to vary the spacing between the bands of the same series.

Thus, the first consecutive cut-outs 52' and 52" can have a smaller spacing so as to obtain a slight spacing between the consecutive transverse bands 50' and 50" as illustrated in FIG. 8. Likewise, the second consecutive cut-outs 54' and 54" can have a smaller spacing so as to obtain a slight spacing between consecutive longitudinal bands 48, 48" as illustrated in FIG. 8.

This arrangement makes it possible to obtain cells with variable cross-sections.

According to the invention, so as to provide the function of frost treatment, the bands 48 and 50 can comprise cut-outs 38 to link certain cells to one another and to obtain a network of tubes. This solution makes it possible to generate a network of tubes, located between the consecutive bands 48 and 50 that are brought close together and are used to channel hot air and to provide the frost treatment function, as illustrated in FIG. 4.

The non-communicating cells are used for the function of acoustic treatment.

This configuration makes it possible to make the functions of frost treatment and acoustic treatment compatible, whereby certain coating cells, those that do not communicate with one another, are provided exclusively for acoustic treatment and others, those that communicate with one another, for frost treatment.

Contrary to the solution that uses a honeycomb alveolar structure, this arrangement makes it possible to adapt the cross-sections of cells based on their function. Thus, the cells 66 that are dedicated to the channeling of hot air for the frost treatment have small cross-sections, and they are delimited by bands 48, 50 that are brought close together whereas the cells 68 that are dedicated to acoustic treatment have larger cross-sections. Thus, as illustrated in FIG. 10, the surface that is occupied by the cells 66 that are dedicated to the acoustic treatment is reduced at the second imaginary surface so as not to reduce the area of the surfaces corresponding to the cells 68 that ensure the acoustic treatment.

As illustrated in FIG. 11, a cavity or a channel 70 into which at least one intake of hot gas, in particular hot air that originates from the power plant, empties out, is provided at at least one portion of the periphery of the alveolar structure 30 of air 40, whereby said at least one channel or cavity 70 communicates via openings or cut-outs 38 with at least one cell 66 that is dedicated to frost treatment.

According to another advantage that originates from the embodiment that is illustrated in particular in FIG. 10, whereby the alveolar structure 30 is not deformed after the bands are assembled, there is no risk of crushing tubes that are used for the frost treatment contrary to the honeycomb solution for which the deformation of the side walls in a random manner during the installation of the coating could lead to the crushing of certain tubes.

According to another advantage, it is possible to distribute the de-icing air precisely by adapting the spacing between the bands to reduce the passage cross-section based on the spot where it is necessary to de-ice in a more significant manner.

Preferably, the acoustically resistive layer 28 that is provided on the second imaginary surface can comprise perforations or microperforations that are provided to link the inside of the cells of the alveolar structure with the outside. Certain perforations or microperforations are thus designed for acoustic treatment and others for frost treatment.

Advantageously, at least the perforations or microperforations that are provided for the frost treatment are inclined and are not normal with respect to the outside surface of the acoustically resistive layer so as to evacuate the hot air in a laminar manner at the outside surface that is to be treated. This configuration also makes it possible to reduce the risk of obstructing holes (perforations or microperforations), in particular by pollution.

Of course, the invention obviously is not limited to the embodiment that is shown and described above, but on the contrary it covers all of the variants thereof.

Thus, this invention is not limited to the leading edge but can be applied to all of the coatings for acoustic treatment that can treat frost with a hot gas.

The invention claimed is:

1. Coating for acoustic treatment relative to an aircraft's surface, said coating comprises:
    an acoustically resistive layer (28),
    at least one alveolar structure (30), and
    a reflective layer (32), wherein,
    said alveolar structure (30) comprises a number of tubes that empty out, on the one hand, at a first imaginary surface (34), and, on the other hand, at a second imaginary surface (36), and
    said alveolar structure (30) further comprises
    i) sets of one or more tubes with side walls free of cut-outs and openings, and
    ii) tubes with side walls having cut-outs (38) linking adjacent tubes so as to create a network of communicating tubes for communicating hot gas around one of the sets of one or more tubes with side walls free of cut-outs and openings, wherein at least one of the communicating tubes is connected to at least one hot gas intake (40).

2. Coating for acoustic treatment according to claim 1, wherein the alveolar structure (30) comprises a series of first non-secant bands (48) that are spaced apart, and at least one second series of second non-secant bands (50) that are spaced apart, and wherein the first bands (48) are secant with the second bands (50) so as to delimit a tube between, on the one hand, two first adjacent bands (48), and, on the other hand, two second adjacent bands (50).

3. Coating for acoustic treatment according to claim 2, arranged at an air intake of an aircraft nacelle, wherein the first bands called longitudinal bands are arranged in radial planes that contain the longitudinal axis (18) of the nacelle.

4. Coating for acoustic treatment according to claim 2, wherein each second band (50) called a transverse band is essentially perpendicular to the tangent at the second imaginary surface (36).

5. Coating for acoustic treatment according to claim 3, wherein each longitudinal band (48) is essentially perpendicular to the tangent of each transverse band (50).

6. Coating for acoustic treatment according to claim 2, wherein the longitudinal bands (48) comprise first cut-outs (52) that work with second cut-outs (54) that are provided at the transverse bands (50).

7. Coating for acoustic treatment according to claim 2, wherein it comprises, on the one hand, first cells (66) that are dedicated to the channeling of hot air for the treatment of frost with small cross-sections, delimited by bands (48, 50) that are brought close together, and second cells (68) that are dedicated to acoustic treatment with larger cross-sections, delimited by bands (48, 50) with a larger spacing than that of the bands (48, 50) that delimit the first cells.

8. Coating for acoustic treatment according to claim 1, wherein it comprises a cavity or a channel (70), connected to a hot gas intake (40), arranged at a portion of the periphery of the alveolar structure, able to communicate with at least one cell (68) that is dedicated to the channeling of the hot gas.

9. Leading edge of an aircraft that incorporates a coating for acoustic treatment according to claim 1.

10. Air intake of a nacelle of an aircraft that incorporates a coating for acoustic treatment according to claim 1.

11. Coating for acoustic treatment according to claim 3, wherein each second band (50) called a transverse band is essentially perpendicular to the tangent at the second imaginary surface (36).

12. Coating for acoustic treatment according to claim 4, wherein each longitudinal band (48) is essentially perpendicular to the tangent of each transverse band (50).

13. Coating for acoustic treatment according to claim 11, wherein each longitudinal band (48) is essentially perpendicular to the tangent of each transverse band (50).

14. Coating for acoustic treatment according to claim 3, wherein the longitudinal bands (48) comprise first cut-outs (52) that work with second cut-outs (54) that are provided at the transverse bands (50).

15. Coating for acoustic treatment according to claim 3, wherein it comprises, on the one hand, first cells (66) that are dedicated to the channeling of hot air for the treatment of frost with small cross-sections, delimited by bands (48, 50) that are brought close together, and second cells (68) that are dedicated to acoustic treatment with larger cross-sections, delimited by bands (48, 50) with a larger spacing than that of the bands (48, 50) that delimit the first cells.

16. Coating for acoustic treatment relative to an aircraft's surface, said coating comprises:
    an acoustically resistive layer (28);

a reflective layer (32); and an alveolar structure (30) delimited by a first imaginary surface (34) and by a second imaginary surface (36), the reflective layer (32) being connected to the alveolar structure at the first imaginary surface (34) and the acoustically resistive layer (28) being alveolar structure at the at the second imaginary surface (36), the alveolar structure (30) comprised of tubes that empty out at the first imaginary surface and at the second imaginary surface, said tubes sealed by, on the one hand, the acoustically resistive porous layer, and, on the other hand, the reflective layer, so as to form cells, the alveolar structure (30) further comprised of cut outs (38), wherein, a first set of said tubes has side walls free of said cut-outs, the first set of said tubes defining non-communicating cells isolated from one another and having an acoustic function, a second set of said tubes has side walls with said cut-outs (38), the cut-outs link adjacent tubes of said second set of tubes so as to create a network of communicating tubes for communicating hot gas around one or more tubes of the first set of said tubes with side walls free of cut-outs, and at least one tube of said first set of said tubes of the network of communicating tubes has a hot gas intake (40).

\* \* \* \* \*